US012113323B2

(12) United States Patent
Essers et al.

(10) Patent No.: US 12,113,323 B2
(45) Date of Patent: Oct. 8, 2024

(54) PRODUCTION OF PRESS-FIT AND CRIMP CONNECTIONS IN A VICE

(71) Applicant: Lisa Dräxlmaier GmbH, Vilsbiburg (DE)

(72) Inventors: Marc Essers, Aachen (DE); Pascal Rabe, Aachen (DE); Christoph Forstmeier, Landshut (DE); Christoph Geffers, Aachen (DE); Uwe Reisgen, Eschweiler (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 950 days.

(21) Appl. No.: 17/257,612

(22) PCT Filed: Jul. 4, 2018

(86) PCT No.: PCT/DE2018/100608
§ 371 (c)(1),
(2) Date: Jan. 4, 2021

(87) PCT Pub. No.: WO2020/007383
PCT Pub. Date: Jan. 9, 2020

(65) Prior Publication Data
US 2021/0273395 A1 Sep. 2, 2021

(51) Int. Cl.
*H01R 43/02* (2006.01)
*H01R 4/02* (2006.01)
(Continued)

(52) U.S. Cl.
CPC ......... *H01R 43/0263* (2013.01); *H01R 4/027* (2013.01); *H01R 4/18* (2013.01);
(Continued)

(58) Field of Classification Search
CPC ...... H01R 43/0263; H01R 4/027; H01R 4/18; H01R 4/187; H01R 43/0421;
(Continued)

(56) References Cited

U.S. PATENT DOCUMENTS

| | | |
|---|---|---|
| 2,480,280 A | 8/1949 | Bergan |
| 2,601,462 A | 6/1952 | Streader |

(Continued)

FOREIGN PATENT DOCUMENTS

| | | |
|---|---|---|
| DE | 412678 | 4/1925 |
| DE | 10 2004 063 056 A1 | 7/2006 |

(Continued)

OTHER PUBLICATIONS

EP1,424,157 A1 English Language Translation.
(Continued)

*Primary Examiner* — Steven T Sawyer
(74) *Attorney, Agent, or Firm* — BelayIP

(57) ABSTRACT

This disclosure relates to a method for connecting a strand element to a connection element using a re-shaping method, such as a connecting a cable lug. A system is also disclosed which comprises a pair of receiving elements having a front side with a recess and a hollow section. The hollow section is designed to accommodate a press insert having a front side with a recess. The receiving element and the press inserts are arranged in a vice. The system also comprises a clamp having a front side with a recess, which is suitable for receiving the connection element. When a pair of receiving elements is arranged, together with the press insert, around a central region of the connection element, then a re-shaping connection, such as a crimp connection, is produced between the strand element and the connection element.

10 Claims, 4 Drawing Sheets

(51) Int. Cl.
*H01R 4/18* (2006.01)
*H01R 43/042* (2006.01)
*H01R 43/048* (2006.01)
*H01R 43/058* (2006.01)

(52) U.S. Cl.
CPC ........... *H01R 4/187* (2013.01); *H01R 43/042* (2013.01); *H01R 43/0421* (2013.01); *H01R 43/048* (2013.01); *H01R 43/058* (2013.01); *Y10T 29/53235* (2015.01); *Y10T 29/53239* (2015.01)

(58) Field of Classification Search
CPC .... H01R 43/058; H01R 43/048; H01R 43/04; H01R 43/042; H01R 43/0424; H01R 43/045; H01R 43/0488; H01R 43/052; H01R 43/0585; B25B 1/04; B25B 1/20; B25B 1/24; B25B 1/2489; B25B 5/04; B25B 5/06; H02G 1/1256
See application file for complete search history.

(56) References Cited

U.S. PATENT DOCUMENTS

| | | | | |
|---|---|---|---|---|
| 2,774,269 | A | 12/1956 | Demler et al. | |
| 3,931,671 | A * | 1/1976 | Dittmann | H01R 43/042 72/461 |
| 4,019,236 | A * | 4/1977 | Osman | H01R 43/04 72/460 |
| 4,214,121 | A * | 7/1980 | Charneski | H01R 3/08 439/86 |
| 5,353,623 | A * | 10/1994 | Bobenhausen | B21D 39/048 72/402 |
| 5,625,942 | A | 5/1997 | Casey | |
| 5,720,197 | A * | 2/1998 | Grau | B21D 39/048 72/402 |
| 2006/0040541 | A1* | 2/2006 | Vaughn | H01R 4/72 439/289 |
| 2012/0279748 | A1* | 11/2012 | Martens | H01R 11/12 174/80 |
| 2014/0102785 | A1 | 4/2014 | Miyamoto et al. | |
| 2015/0200513 | A1* | 7/2015 | Isus Feu | H01R 4/20 228/155 |
| 2017/0054261 | A1* | 2/2017 | Muja | H01R 43/058 |

FOREIGN PATENT DOCUMENTS

| | | |
|---|---|---|
| EP | 1424157 A1 | 6/2004 |
| GB | 710974 | 6/1954 |

OTHER PUBLICATIONS

DE10 2004 063 056 A1 English Language Translation.
DE412678 English Language Translation.
PCT/DE2018/100608 International Search Report in German.
PCT/DE2018/100608 International Search Report Translation.

* cited by examiner

PRODUCTION OF PRESS-FIT AND CRIMP CONNECTIONS IN A VICE

CROSS REFERENCE TO RELATED APPLICATIONS

This application is a national phase application of International Application No. PCT/DE2018/100608, filed on Jul. 4, 2018 the content of both of which is incorporated herein by reference.

BACKGROUND OF THE INVENTION

The present disclosure relates to a method for connecting a strand element to a connecting element using a re-shaping method, in particular a method of crimping, at least in parts of the manufacturing process, using a vice or clamping vice. The method is used in particular for connecting a pipe to a terminating element or connecting element, or, for example, for connecting a cable to a cable lug.

BRIEF SUMMARY OF THE INVENTION

In the example of connecting a cable to a cable lug, post-processing may be required to completely manufacture the workpiece. This post-processing can include a drilling procedure and/or welding process. In certain cases, a high pressure is exerted on the crimp connection, so that this crimp connection can be damaged or destroyed and thus the joining process suffers a significant loss of quality.

The aim of the present disclosure is therefore to at least partially overcome these disadvantages using means that are as simple as possible in terms of construction.

The problem is solved by the subject-matter of the independent claims. Advantageous embodiments of the invention are disclosed in the dependent claims, the description and the accompanying figures.

A system according to the present disclosure, which is designed to establish a mechanical connection between a strand element and a connecting element, has the following components:

A pair of receiving elements, of which each receiving element has a front side with a recess and a hollow section. The recess is suitable for accommodating the connection element. For this purpose, the recess can be designed so that it surrounds the connection element at a distance, for example with less than 1 mm or less than 0.1 mm. In some embodiments, the recess can be designed in such a way that the connection element is easily squeezed when the pair of receiving elements encloses the connection element. The recess can be arranged in the middle of the front side. The recess may be semicircular, oval, triangular or polygonal in shape. The shaft can be located essentially in the middle of the front side. The shaft can be completely enclosed by the material of the receiving element, but it can also be at least partially open to one side. The open side can be designed in such a way that elements of a slide can be accommodated at this point.

The system also has a pair of press inserts. In this case, each press insert has a front side with a recess which extends over the entire narrow side of the front side. The recess of the press inserts has a smaller diameter than the recess of the receiving elements, so that the press insert is suitable for re-shaping the connection element. The press insert is designed to be arranged in the shaft of the connection element. This is designed in such a way that when the press insert is arranged in the shaft, the recess of the press insert is essentially aligned with the recess of the receiving element, as seen from the different diameters and shapes of the recess. In one embodiment, the press insert can protrude up to 0.2 mm. This has the advantage that the clamping forces are essentially introduced into the workpiece via the press inserts. In one embodiment, the combination of receiving element and press insert, or combination of receiving element, press insert and adapter plate, is designed as a single piece.

The receiving elements and the press inserts are arranged in a vice or clamping vise which, depending on the embodiment, can be operated in a vertical and/or horizontal installation position. A vice or clamping vise is usually used to fix or clamp certain workpieces for machining. However, the machining of the workpieces is carried out by other machines, such as milling machines. In the present invention, however, the vice or clamping vise is used for the machining, in particular for re-shaping, the workpieces. This is particularly advantageous because it allows standard machine tools, such as a vice or clamping vise, to be used for the production of the re-shaping of workpieces, for example a crimp connection. Only the specific forming or crimping tools, such as the receiving elements and the press inserts, have to be used in these standard machine tools.

Furthermore, the system can have a clamp. The clamp has a front side with a recess which is suitable for receiving the connection element. For this purpose, the recess can be designed in such a way that it encloses the connection element at a distance, for example less than 1 mm or less than 0.5 mm. The recess can be located in the middle of the front side. The recess may be semicircular, oval, triangular or polygonal in shape. The clamp further comprises a stop which is arranged on a first side of the clamp. In one embodiment, the stop does not completely close the recess of the clamp but is suitable for allowing a protruding part of the connection element to protrude beyond the connecting element. In one embodiment, the stop can be moved.

During the production of the connection, the system accommodates the strand element with the connection element, which is arranged at a first end of the strand element, up to the stop and arranges the pair of press inserts around a central region (seen in the axial direction) of the connection element. The middle region of the connection element can comprise the middle third, but it can also extend to one end of the connection element. The press inserts and the receiving elements are therefore designed in pairs so that they can be arranged as symmetrically as possible around the central region of the connection element and thus achieve a symmetrical and high-quality re-shaping. In one embodiment, more than two press inserts and receiving elements are used in the production.

In one embodiment, the strand element is a pipe that can be used, for example, for pipe connections in sanitary engineering.

In one embodiment, the strand element is an electrical line or a bundle of lines such that the establishment of a mechanical connection simultaneously causes the establishment of an electrical connection. The above-mentioned process enables an electrical connection with low contact resistance to be made in a relatively simple manner.

In one embodiment, the strand element consists at least partially of plastics, in particular of thermoplastics, of soft metals, in particular of aluminum or copper or of aluminum and/or copper alloys, and/or of steel and/or of combinations of these materials. In one embodiment, the connection element consists at least partially of plastics, in particular thermoplastics, of soft metals, in particular aluminum or copper or aluminum and/or copper alloys, and/or of steel and/or com-of these materials. In one embodiment, the strand element and/or the connection element is coated with plastics, with lacquer, with metals, in particular with nickel, tin, zinc, silver. The measures mentioned above have the advantageous effect of further improving the conductivity, in particular the transition and total resistance and/or the corrosion resistance, strength properties and/or flow properties of the manufactured workpiece.

In one embodiment, the pair of recesses of the press inserts forms a hexagon. This is particularly advantageous for cables with a certain thickness, which are to be fixed during assembly.

In one embodiment, the system further comprises a welding tool for the bonded connection of the strand element and the connection element. This allows a connection of the highest quality, both under mechanical and electrical aspects. With some types of welding tools, welding is performed under high pressure. For example, the axial force used can be greater than 1 kN, in particular greater than 10 kN. A system according to the invention ensures that a connection of such high quality has been produced by the re-shaping process, for example by the crimping process described, that the welding process forces that occur do not lead to a break or deterioration of the connection. In one version, a press joint welding process, such as friction spot welding, is used as the welding process. This creates a very compact weld structure.

In one embodiment, the stop is closed by means of a closing spring. This is particularly advantageous if the stop is part of a machine with which the crimp process is carried out fully automatically or partially automatically because with this, the workpiece can be released very easily, for example for removal, and then closed again during the production process.

In one embodiment, the pair of receiving elements is driven by the jaws or the jaw attachment of a vice or clamping vise. Only one of the jaws can be movable. This allows large forces to be applied in a reproducible manner during the forming process.

In one embodiment, at least one side of the vice or clamping vise is integrated into a tool unit which is moved along a sliding bar. This makes it possible to integrate the product into the manufacturing process in a single and effective manner.

In one embodiment, the system has a further clamping element which is suitable for accommodating the strand element and is moved together in particular with the tool unit. This further improves the production process because it enables or at least simplifies the exact fixing of the workpiece at the beginning of the production process.

In an advantageous embodiment, a holding device serves as part of the receiving element for receiving the strand element and a die which is arranged correspondingly on the tool unit is provided for positioning and aligning the connecting element relative to the strand element. The holding device and the correspondingly arranged die are mounted such that they can be displaced horizontally and/or vertically relative to one another by means of at least one compensating element. Furthermore, the die has a clamping element which is designed to correspond to a tab or lug of the connection element and thus allows the positioning and orientation of the connection element by means of the movement of the clamping element.

In one embodiment, the connecting element has a tab or lug, and the tab or lug can be designed as a screw tab or lug. The tab or lug may have an opening. Such connecting elements with tab or lug are required for many applications, for example in industry or automotive engineering. For this type of connecting elements, it is possible to select a design of the clamp in which the stop does not completely close the recess of the clamp, but which is suitable for allowing a projecting part of the connecting element to protrude beyond the connecting element.

In one embodiment, the system has cooling and/or preheating. This can improve process stability and/or tool life. In addition, cooling and/or preheating of the workpiece can improve the crimping and/or welding properties. For example, the optimum process temperature can be set and maintained for each material combination of strand element and connection element. In one embodiment, the preheating can be used to support the re-shaping, for example for workpieces that contain thermoplastics.

The present disclosure also relates to a method for producing a mechanical (non-positive and, depending on the choice/shape of the press insert, simultaneously positive) connection between a strand element and a connection element. Components are used as specified above. According to the method, the strand element is arranged with the connection element against a stop of a clamp. After being inserted into the system, the workpiece is arranged on the stop in such a way that the connection element lies directly against the stop.

This improves the reproducibility and/or quality of production. Finally, a bonded connection of the strand element and the connection element is generated by means of a welding tool. This enables a connection of the highest quality, both mechanically and electrically. With some types of welding tools, welding is performed under high pressure. For example, the axial force used can be greater than 1 kN, in particular greater than 10 kN. The aforementioned method ensures that a connection of such high quality has been produced by the re-shaping, for example by the described crimping process, that the welding process forces thus occurring do not lead to any break of the connection.

In one embodiment, the strand element is arranged in the connection element in such a way that a predefined distance remains between a first end of the strand element and the inside of the front side of the connection element. In this way, an expansion of the strand element during production, for example due to thermal effects, can be compensated, so that the strand element does not move in the connecting element during production and thus the connection deteriorates. In one embodiment, a stop can also be provided for the strand (the strand element).

In an advantageous embodiment of the method, it is intended that a pair of press inserts is arranged around a central region of the connection element. The middle area of the connection element can comprise the middle third, but it can also extend to one end of the connection element.

It has also proven to be advantageous to move the strand element and the connection element vertically and/or horizontally against each other until the connection element is optimally positioned and aligned relative to the strand element.

Furthermore, according to the invention, at least part of the system, the strand element and/or the connection element is cooled and/or preheated during the forming process and/or during the subsequent welding process. As a result, excessive temperature differences between the individual components of the system or the strand element or the connection element during the crimp and/or the welding process, thereby improving the process quality and the joining properties between the strand element and the connection element.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, an advantageous embodiment of the invention is explained with reference to the accompanying figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1C:
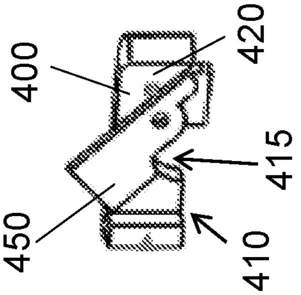
FIG. 1*c* is the schematic representation of an embodiment of a clamp.
Figure 1B:
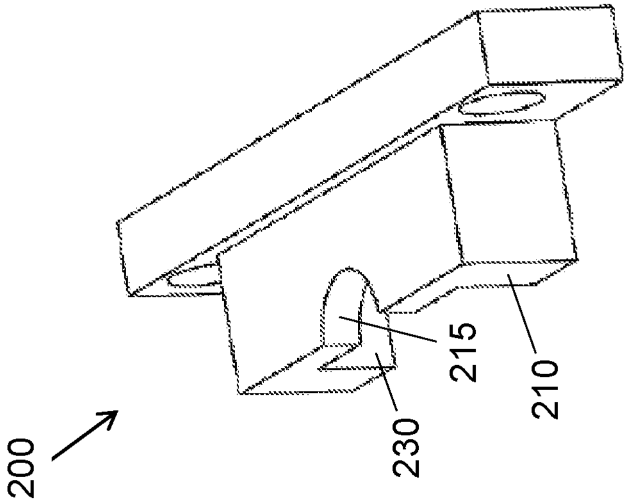
FIG. 1*b* is the schematic representation of an embodiment of a receiving element.
Figure 1A:
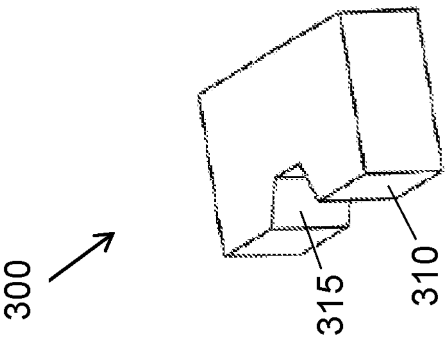
FIG. 1*a* is the schematic representation of an embodiment of a press insert.

FIG. 1*a* depicts the schematic representation of a press insert 300. It is clearly visible that the recess 315 extends over the entire narrow side of the front side 310 of the press insert 300. The recess 315 is designed in such a way that it has a smaller diameter than the recess 215 of the receiving elements 200 (see FIG. 1*b*). As a result, the press insert 300 is suitable for reshaping the connection element 150 (see FIG. 2*a*). In the embodiment shown, the recess 315 is designed to have a hexagonal shape when the press insert 300 is used in pairs.

FIG. 1*b* shows the schematic representation of a receiving element 200. The receiving element 200 has a recess 215 on the front side 210. The receiving element 200 further comprises a hollow section 230. This is opened downwards in the embodiment shown. The receiving element 200 is designed in such a way that, if the press insert 300 (see FIG. 1*a*) is arranged in the hollow section 230, the recess 315 of the press insert 300 is substantially aligned with the recess 215 of the receiving element 200, apart from the different diameters and shapes of the recess 215 and 315. In one embodiment, the press insert can protrude up to 0.2 mm.

FIG. 1*c* shows the schematic representation of a clamp 400. The clamp 400 has a recess 415 on the front side 410 (this is shown in FIG. 1*c* on the bottom). On a first side 420, the clamp 400 has a stop 450. In the embodiment shown, the clamp 400 is designed to be movable. It can be clearly seen that the stop 450, when guided downwards and closed, does not completely close the recess 415 of the clamp 400, but is suitable for allowing a protruding part of the connection element to protrude beyond the connection element.

Figure 2A:
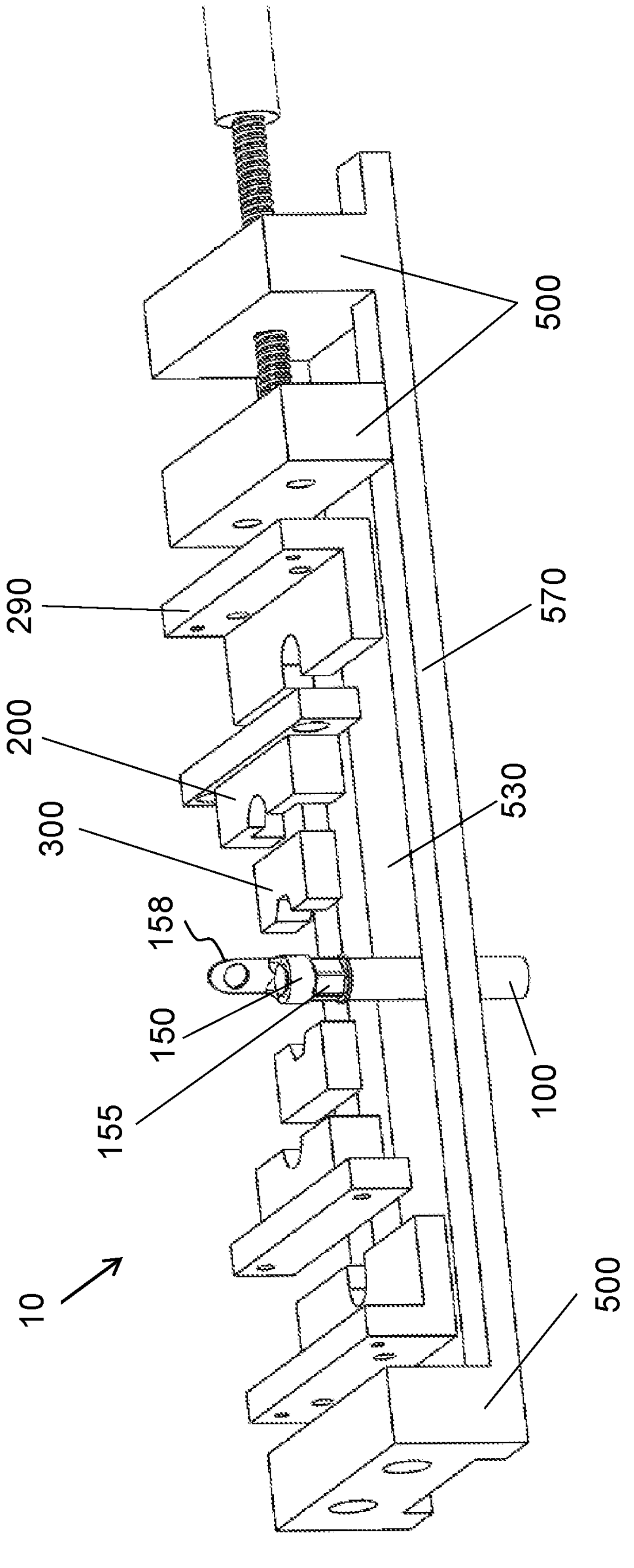
FIG. 2*a* is the schematic representation of an embodiment of a system implemented by means of a vice or clamping vice.

FIG. 2*a* shows the schematic explosion representation of a system 10 according to the invention, which was realized by means of a vice or clamping vice. The elements press insert 300 and the receiving element 200 are mounted on an adapter plate 290, which is arranged on a carriage track 530. The elements press insert 300 and the receiving element 200 on an adapter plate 290 can also be configured as one piece. The Adapter Plate 290 allows easy mounting on a vice 500. It can be clearly seen that the elements press insert 300, receiving element 200 and adapter plate 290 are arranged in pairs opposite each other.

A strand element 100 and a connection element 150 are arranged in the middle of the system 10. The connection element 150 has a tab or lug 158. The connection element 150 is shown after the re-shaping and opening of the system 10; wherein the middle area 155 of the connection element 150 was pressed into a hexagonal shape, by closing the movable element of the vice 500. A vice 500 can exert enormous forces on the workpiece in a predictable manner and ensure a satisfactory repeatability of the motion sequences, thus cause achieving a high quality forming process.

Figure 2B:
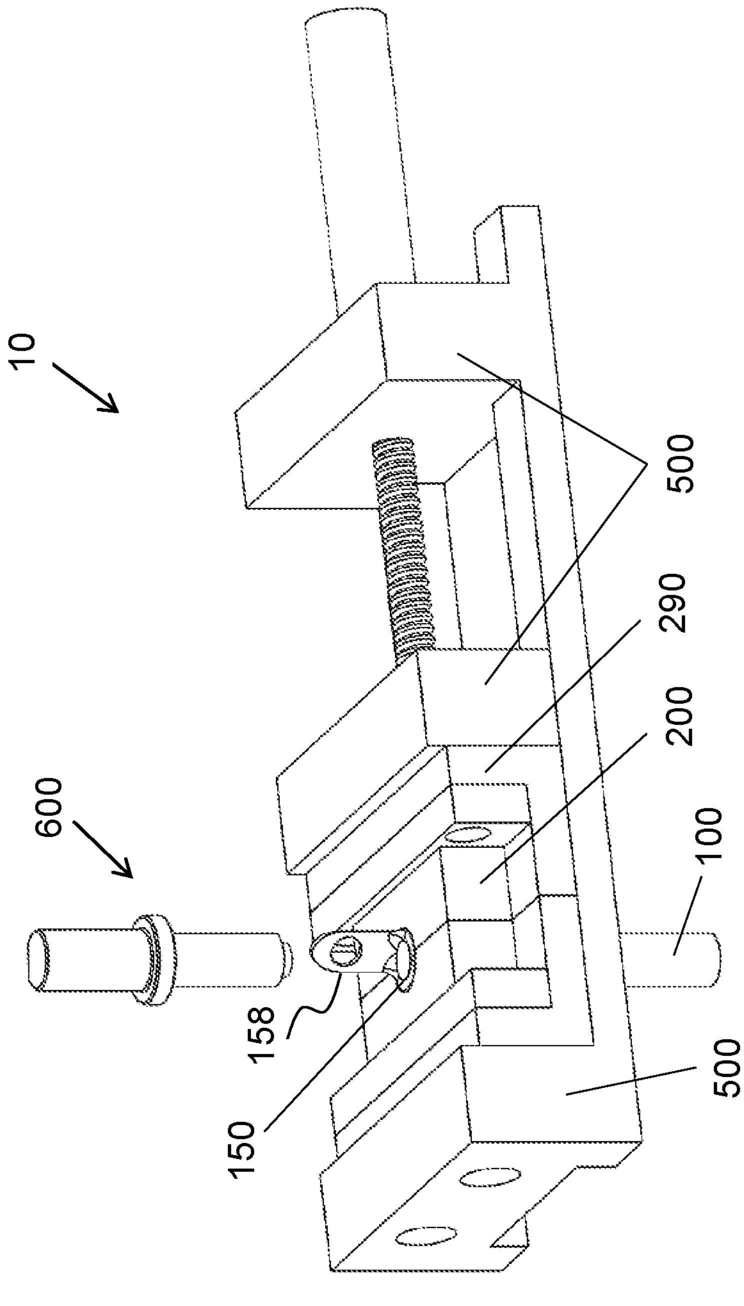
FIG. 2*b* is a closed vice or clamping vice at the end of the forming process.

FIG. 2*b* shows a closed vice immediately after the end of the forming process. Only the tab or lug 158 and an upper part of the connection element 150 are still visible. The change in the elements of the vice 500 is clearly visible, especially in comparison with FIG. 2*a*. The press insert 300 is covered by the closed receiving element 200. Above the connection element 150, a welding tool 600 is shown (e.g. based on a friction spot welding tool, a sonotrode, an electrode or a hot die). The welding tool 600 can be used to achieve a bonded connection of the strand element 100 and the connection element 150 after the forming thus further improving the quality of the connection.

Figure 3:
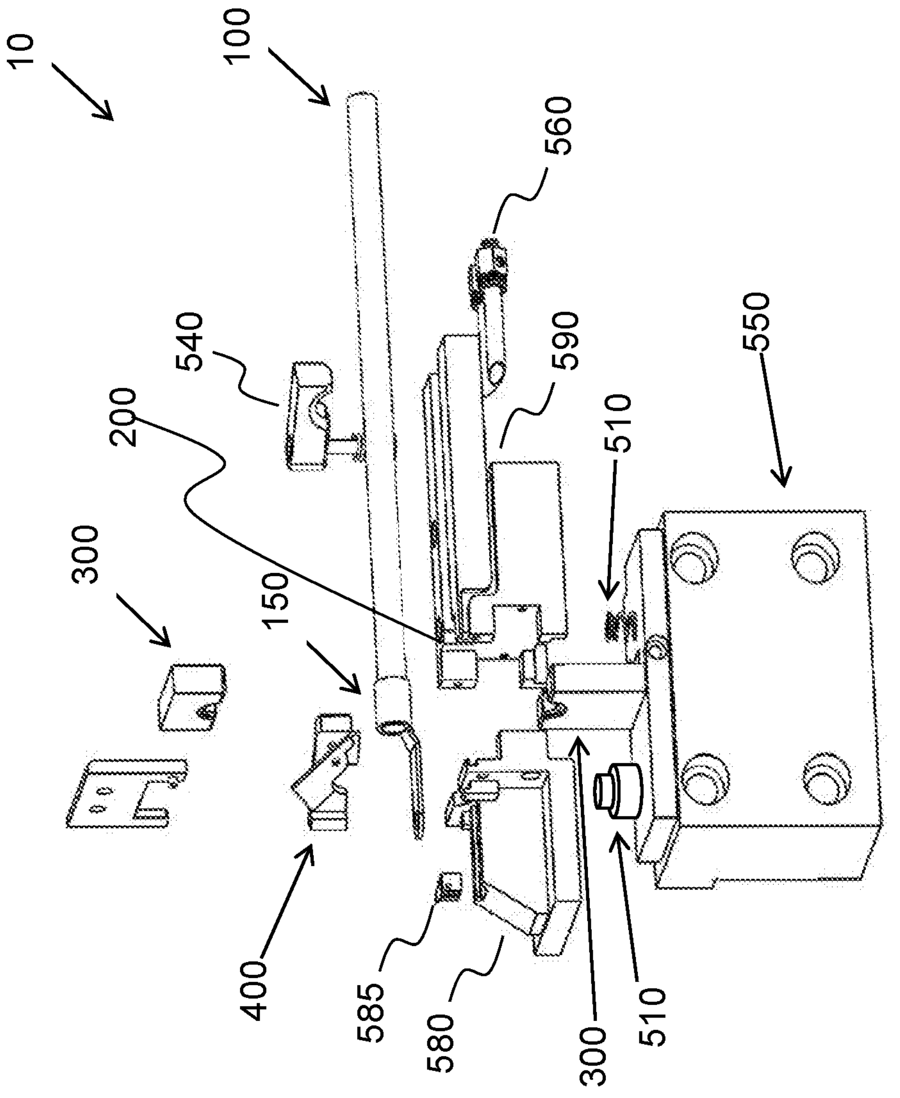
FIG. 3 shows the schematic exploded drawing of an embodiment of the system with a die and a holding device.

In one embodiment of FIG. 3, the system 10 is arranged vertically. The receiving element 200 is mounted in a floating manner in the vertical direction on a lower tool unit 550 by means of a spring mechanism and can be moved relative to the press insert 300 in the open vice position. The receiving element 200 is designed in such a way that, in addition to the connection element 150, it also receives the strand element 100 in a separate recess/mold cavity outside the forming area by means of a die 580 and a holding device 590. The strand element 100 and the connection element 150 are inserted horizontally into the receiving element 200, whereby the connection element 150 is fixed via a clamp 400 and the strand element 100 is fixed via a separate clamping element 540 on the receiving element 200 to the receiving element 200 or on a holding device 590 as part of the receiving element 200. In addition, the die 580 for mounting and positioning the connection element 150 is shown in FIG. 3. The holding device 590 and thus the receiving element 200 can be displaced in the vertical and/or horizontal direction relative to the die 580. This allows easier mounting and positioning of the connection element 150 relative to the strand element 100. This is preferably achieved by a compensation element 510, which can be a spring, a hydraulic cylinder or a similar mechanical compensation element. The compensation element 510 is preferably arranged on the lower tool unit 550 below the die 580 and/or below the holding device 590 of the receiving element 200. In the example shown in FIG. 3 the die 580 is held by a stamp-shaped hydraulic compensation element 510 and the holding device 590 of the receiving element 200 is held as the compensation element 510 by means of a spring. Furthermore, the die 580 has a clamping hook 585 which detects the tab or lug 158 of the connection element 150 and thus serves to support the positioning of the connection element 150. Due to the conception according to FIG. 3, the receiving element 200 in this insertion position is arranged higher by the spring mechanism than the press insert 300. This has the advantage that tilting or slipping of the connection element 150 and the strand element 100 on the relatively narrow press insert 300, which otherwise protrudes from the receiving element 200 and whose width is usually 10 mm, is avoided.

The figures are merely schematic representations and serve only to explain the invention. Elements that are identical or have the same effect are consistently marked with the same reference signs.

The invention claimed is:

1. A system for establishing a mechanical connection between a strand element and a connection element having a protruding part, the system comprising:

a pair of receiving elements, each of the receiving element comprising a front side with a hollow section and a recess configured to receive the connection element, a pair of press inserts, each of the press inserts comprising a front side with a recess extending over the entire surface of the front side, the recess comprising a polygon or a hexagon form when brought together, a clamp comprising a front side having a recess suitable for accommodating the connection element and a stop arranged on a first side of the clamp such that when the stop is guided downwards and closed, the stop does not completely close the recess of the clamp and the recess is configured to enable the protruding part to protrude beyond the connection element, and wherein the press insert is designed to be arranged in the hollow section and, if the press insert is arranged in the hollow section, the recess of the press insert is substantially aligned with the recess of the receiving element, wherein the receiving elements and the press inserts are arranged in a vice so that the system includes the strand element with the connection element, which is arranged at a first end of the strand element, and wherein the pair of press inserts is arranged around a central region of the connection element.

2. The system according to claim 1, wherein, the strand element at least partially comprises at least one of plastics and thermoplastics, and the strand element at least partially comprises at least one of soft metals aluminum, copper, aluminum, copper alloys, and steel, the connection element at least partially comprises at least one of plastics, thermoplastics, and the connection element comprises at least one of soft metals, aluminum, copper, aluminum, copper alloys and steel, and at least one of the strand element and the connection element is coated with at least one of plastics, lacquer, metals, nickel, tin, zinc and silver.

3. The system according to claim 1, wherein the system further comprises a welding tool configured and arranged to form a bonded connection of the strand element and the connection element.

4. The system according to claim 1, wherein the pair of receiving elements are configured to be driven by the jaws or the jaw attachment of a vice.

5. The system according to claim 4, wherein at least one jaw side of the vice is integrated in a tool unit which can be moved along a sliding bar relative to a second tool unit.

6. The system according to claim 1, wherein a holding device serves as part of the receiving element for receiving the strand element and a die arranged correspondingly on the tool unit for positioning and aligning the connection element relative to the strand element.

7. The system according to claim 6, wherein the holding device and the correspondingly arranged die are mounted such that they can be displaced at least one of horizontally and vertically relative to one another by means of at least one compensation element.

8. The system according to claim 6, wherein the die has a clamping hook corresponding to a tab or lug of the connection element and thus allowing the positioning and alignment of the connection element by means of the movement of the clamping hook.

9. The system according to claim 1, wherein the system further comprises at least one of a cooling system and a preheating system, with which at least parts of at least one of the system, the strand element and/or the connection element can be cooled or heated during at least one of the forming process and during the subsequent welding process.

10. The system according to claim 1, wherein the clamp is configured to be movable.

* * * * *